(12) United States Patent
Cuddihy et al.

(10) Patent No.: US 7,401,063 B2
(45) Date of Patent: Jul. 15, 2008

(54) PROCESS FOR SEMI-AUTOMATIC MAINTENANCE OF A KNOWLEDGE BASE USING TAGGED EXAMPLES

(75) Inventors: Paul Edward Cuddihy, Ballston Lake, NY (US); Jeremiah Francis Donoghue, Ballston Lake, NY (US); Steven Hector Azzaro, Schenectady, NY (US); Timothy Lee Johnson, Niskayuna, NY (US); Daniel Joseph Cleary, Schenectady, NY (US); Lijie Yu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 894 days.

(21) Appl. No.: 10/318,682

(22) Filed: Dec. 16, 2002

(65) Prior Publication Data
US 2004/0117335 A1 Jun. 17, 2004

(51) Int. Cl.
*G06N 5/00* (2006.01)

(52) U.S. Cl. .............. 706/50; 706/45; 706/47

(58) Field of Classification Search ........... 706/50; 707/100, 102, 2; 715/512, 517; 704/9
See application file for complete search history.

(56) References Cited

U.S. PATENT DOCUMENTS

| | | | | |
|---|---|---|---|---|
| 5,418,951 A | | 5/1995 | Damashek | |
| 5,737,739 A | * | 4/1998 | Shirley et al. | 715/512 |
| 5,740,425 A | * | 4/1998 | Povilus | 707/100 |
| 5,953,528 A | * | 9/1999 | Sullivan | 707/100 |
| 6,081,774 A | * | 6/2000 | de Hita et al. | 704/9 |
| 6,161,114 A | * | 12/2000 | King et al. | 715/517 |
| 6,167,368 A | * | 12/2000 | Wacholder | 704/9 |
| 6,289,353 B1 | * | 9/2001 | Hazlehurst et al. | 707/102 |
| 6,928,425 B2 | * | 8/2005 | Grefenstette et al. | 707/2 |

FOREIGN PATENT DOCUMENTS

WO WO02/27544 A1 4/2002

* cited by examiner

*Primary Examiner*—Wilbert L Starks, Jr.
(74) *Attorney, Agent, or Firm*—Fletcher Yoder

(57) ABSTRACT

The present invention provides a computer implemented method for maintaining a knowledge base. The method taking as input, text examples that are tagged with a structural markup language; and maps knowledge nodes in the knowledge base with the tagged examples to determine: (1) the knowledge nodes that best match the tagged examples, and (2) the knowledge nodes that are best connected to the tagged examples. The results are displayed to the user, who verifies that the tagged examples match the selected knowledge nodes. Based on the user response, indices of the knowledge nodes are updated. The method may further include determining discrepancies between the existing knowledge base and the tagged examples, and further displaying the discrepancies to the user. The user can update the missing information in the knowledge base to remove the discrepancies in the existing knowledge base.

11 Claims, 9 Drawing Sheets

CASE 1

RADIO DOES NOT WORK.

DISPLAY IS DARK.

PUT IN A NEW RADIO.

401

CASE 2

RADIO DOES NOT WORK.

RADIO DISPLAY IS DUM WHEN OFF, BUT WHEN YOU TURN IT ON, THEN IT GOES DARK.

BLOWN FUSE 13 REPLACED.

403

CASE 3

HATCHBACK LIGHT WOULD NOT TURN OFF.

DOME LIGHT ALSO ON.

GREASED THE LATCH AND NOW IT WORKS.

405

PROCESS FOR SEMI-AUTOMATIC MAINTENANCE OF A KNOWLEDGE BASE USING TAGGED EXAMPLES

BACKGROUND OF THE INVENTION

Knowledge is an important resource for business organizations. It is constantly being generated as a result of the continuous accumulation of information, and its use by an organization. Knowledge bases are used to store the generated knowledge.

Knowledge bases need regular maintenance, as knowledge is not a static resource. Fresh insights, changing business requirements, alternative or external resources and acquired experiences have to be constantly incorporated to the existing knowledge.

To this end, usually there are knowledge engineers who are assigned the task of maintaining and updating knowledge bases. Maintaining a structured knowledge base involves searching through the knowledge base to match the knowledge present in the knowledge base with knowledge obtained from interviews with experts. This is an economically unviable and manually intensive process. Knowledge engineers have to depend completely on the experts to determine whether any information is missing, or any discrepancies exist in the knowledge base, and to provide them with the necessary information.

Another problem that knowledge engineers face is the task of classifying the information that they obtain through interviews with experts, for incorporation into the knowledge base. Known techniques fail to appreciate and effectively address these concerns.

Accordingly, the present invention addresses the above-mentioned problems and others.

BRIEF SUMMARY OF THE INVENTION

The present invention provides systems and methods for maintaining knowledge bases using tagged text examples. In accordance with one aspect, the present invention provides a method that is envisioned to work in a knowledge base, where the information is arranged in knowledge nodes such as "symptom" and "solution". These knowledge nodes are set in hierarchical structures or a network of nodes (semantic network) that are further indexed with text matching methods. The present invention takes as input, text examples that are tagged with a structural markup language. These tagged examples are compared to knowledge nodes in the knowledge base to determine: (1) the knowledge nodes that best match the tagged examples, and (2) the knowledge nodes that are best connected to the tagged examples short-listed from the knowledge nodes that best match the tagged examples. The results are displayed to the user, and the user verifies that the tagged examples match the selected knowledge nodes. Based on the user's response, indices of the knowledge nodes are updated. The method may further include determining discrepancies between the existing knowledge base and the tagged examples, and displaying the discrepancies to the user. The user can update the missing information in the knowledge base to remove the discrepancies in the existing knowledge base.

In accordance with one aspect, the present invention provides a system for maintaining a knowledge base, where information in the knowledge base is arranged in knowledge nodes such as "symptom" and "solution", set in hierarchical structures or a network of nodes (semantic) structure that are further indexed with text matching methods; an input portion that accepts an input of text examples that are tagged with a structural markup language; a mapping portion that matches knowledge nodes in the knowledge base with the tagged examples to determine: first, a best match between the knowledge nodes and the tagged examples and; second, the best-connected knowledge nodes, from the knowledge best matched to the tagged examples; a modifying portion for updating the indices of the knowledge nodes; and a displaying portion which shows the discrepancies between the existing knowledge base and the tagged examples to the user, which the user can update accordingly.

In accordance with one aspect, the present invention provides a computer readable medium for maintaining a knowledge base where a first portion of the computer readable program accepts an input of text examples that are tagged with a structural markup language; a second portion matches knowledge nodes in the knowledge base with the tagged examples to determine the knowledge nodes that best match the tagged examples and; from the knowledge best matched to the tagged examples, the best-connected knowledge nodes are determined; a third portion updates the indexes of the knowledge nodes; and a fourth portion shows the discrepancies between the existing knowledge base and the tagged examples to the user, which the user can update accordingly.

BRIEF DESCRIPTION OF THE DRAWINGS

The various embodiments of the present invention will hereinafter be described in conjunction with the appended drawings provided to illustrate and not to limit the present invention, wherein like designations denote like elements, and in which.

DETAILED DESCRIPTION OF THE INVENTION

The present invention is envisioned to be operating in structured knowledge bases such as Bayesian Belief Nets (BBN) and others, interactive learning systems such as equipment Failure Modes And Effects Analysis (eFMEA), Decision trees and Case-based reasoning systems. Information in these structures is arranged in a hierarchical form or a network of nodes (semantic network) comprising knowledge nodes, and the present invention may be adapted to operate on any structures that have a hierarchical form or semantic network of structuring information into knowledge nodes. Further, each of the knowledge nodes is indexed with text matching methods, including, but not limited to n-gram, keyword frequency and arrays.

It may be noted, however, that though the present invention is envisioned to be operating in conjunction with structured knowledge bases, this does not limit the scope of the present invention in any manner. Further, it should be further understood that the present invention can also be implemented with a network of nodes (semantic network). Further, the recitation of network structures includes those structures that are hierarchical forms, semantic networks and any other types that may be used by those skilled in the art.

Figure 1:
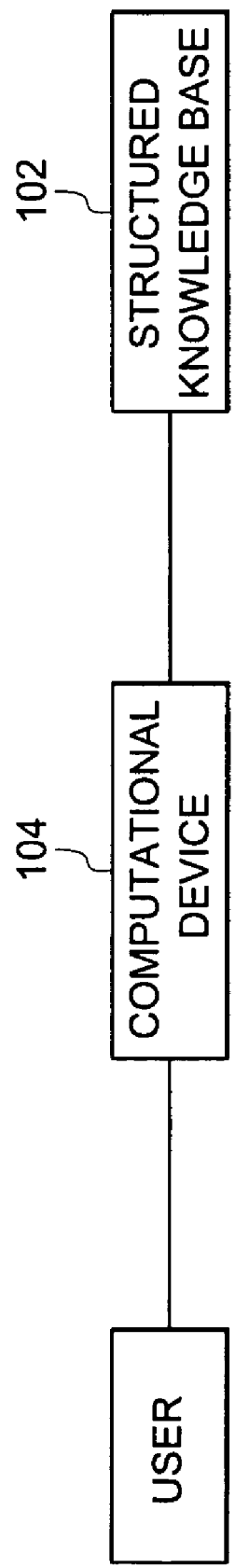
FIG. 1 is a block diagram that illustrates the general environment in which one embodiment of the present invention works.

FIG. 1 is a block diagram that illustrates the general environment in which one embodiment of the present invention works. The present invention resides on a computational device 104, and accesses a database 102. Database 102 contains documents such as case notes. Typical examples of database 102 include Oracle InterMedia and Microsoft SQLServer. A user interacts with the present invention and inputs tags and keywords. The present invention then automatically tags the case notes.

Typical examples of computing device 104 include a general-purpose computer, a programmed microprocessor, a micro-controller, a peripheral integrated circuit element, a server and other devices or arrangements of devices. Computational device 104 is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described below in the flowcharts. Such a set of instructions for performing a particular task may be characterized as a program, software program, or simply software.

Computational device 104 executes a set of instructions that are stored in one or more storage elements, in order to process input data. The storage elements may also hold data or other information as desired. The storage element may be in the form of a database or a physical memory element present in the processing machine.

The set of instructions may include various instructions that instruct computational device 104 to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by computational device 104 may be in response to user commands, or in response to results of previous processing or in response to a request made by another processing machine.

A person skilled in the art can appreciate that it is not necessary that the various computational devices 104 and/or storage elements be physically located in the same geographical location. Computational devices 104 and/or storage elements may be located in geographically distinct locations and connected to each other to enable communication. Various communication technologies may be used to enable communication between computational devices 104 and/or storage elements. Such technologies include connection of computational devices 104 and/or storage elements, in the form of a network. The network can be an intranet, an extranet, the Internet or any client server models that enable communication. Such communication technologies may use various protocols such as TCP/IP, UDP, ATM or OSI.

In the system and method of the present invention, a variety of "user interfaces" may be utilized to allow a user to interface with computational device 104 or machines that are used to implement the present invention. Computational device 104 uses the user interface to interact with a user in order to convey or receive information. The user interface could be any hardware, software, or a combination of hardware and software used by computational device 104 that allows a user to interact with the processing machine. The user interface may be in the form of a dialogue screen and may include various associated devices to enable communication between a user and computational device 104. It is contemplated that the user interface might interact with another computational device 104 rather than a human user. Further, it is also contemplated that the user interface may interact partially with other computational devices 104 while also interacting partially with the human user.

Figure 2:
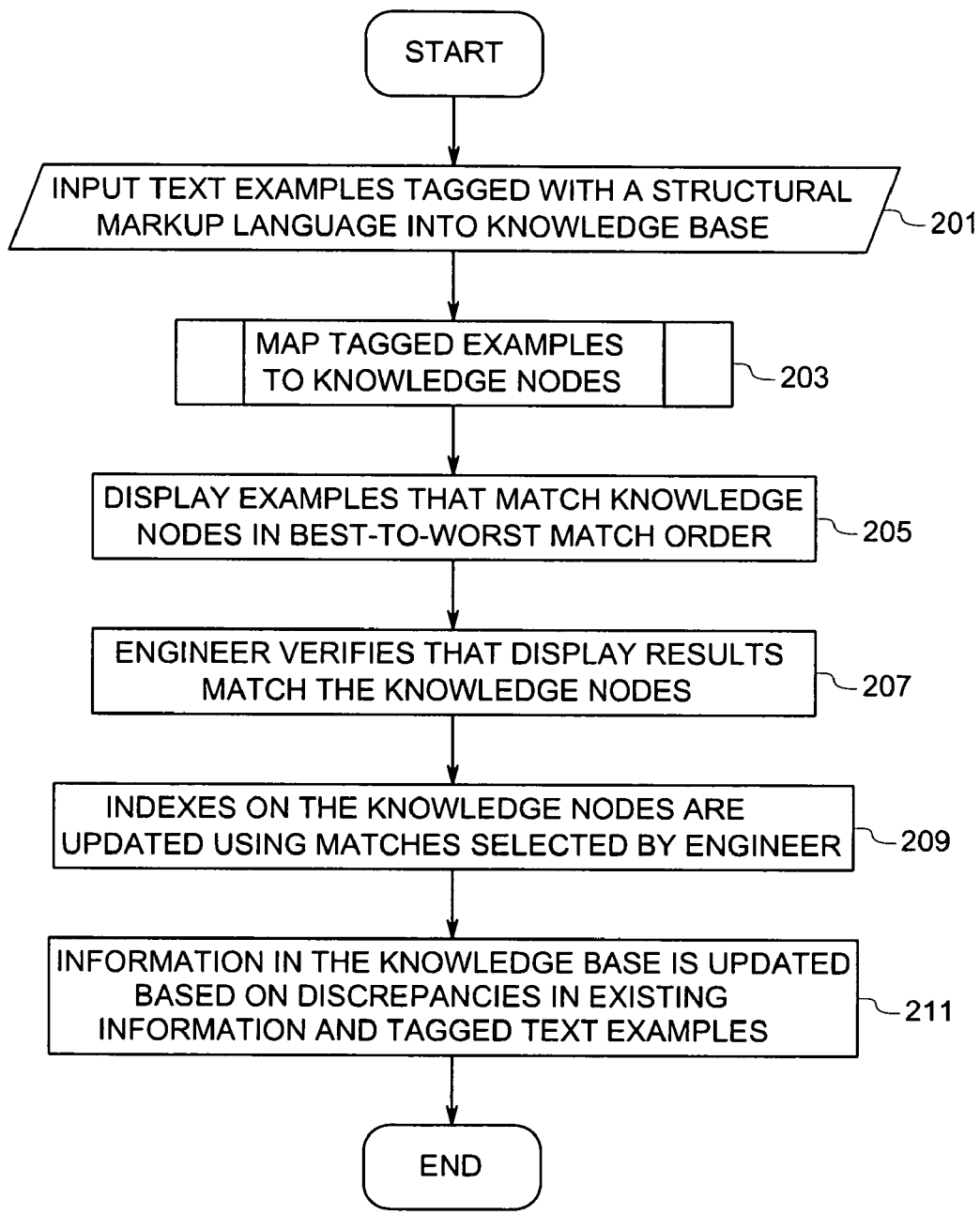
FIG. 2 is a flowchart that illustrates the working of the present invention in accordance with one embodiment of the present invention.

FIG. 2 is a flowchart that illustrates the working of the present invention in accordance with one embodiment of the invention. At step 201, there is an input of a set of text examples, which are tagged with a structural markup language. In a preferred embodiment, the structural markup language used is eXtensible Markup Language (XML).

At step 203, the tagged text examples are mapped to knowledge nodes in the knowledge base. This mapping process is explained in detail in FIG. 3.

At step 205, the knowledge nodes that best match and are best connected to the tagged example are presented to the user in order of decreasing relevance.

At step 207, the example that has been selected for processing is displayed and the user verifies that the text matches the knowledge nodes. If there are multiple matches, the matches are displayed to the user with matching and mismatching parts highlighted, so that the user can determine the most relevant matches.

At step 209, indexes on the knowledge nodes selected by the user are updated according to the matches selected by the user.

At step 211, discrepancies between the existing knowledge base and the tagged text examples are displayed to the user and the user indicates what needs to be updated. The user can update this knowledge accordingly.

Figure 3:
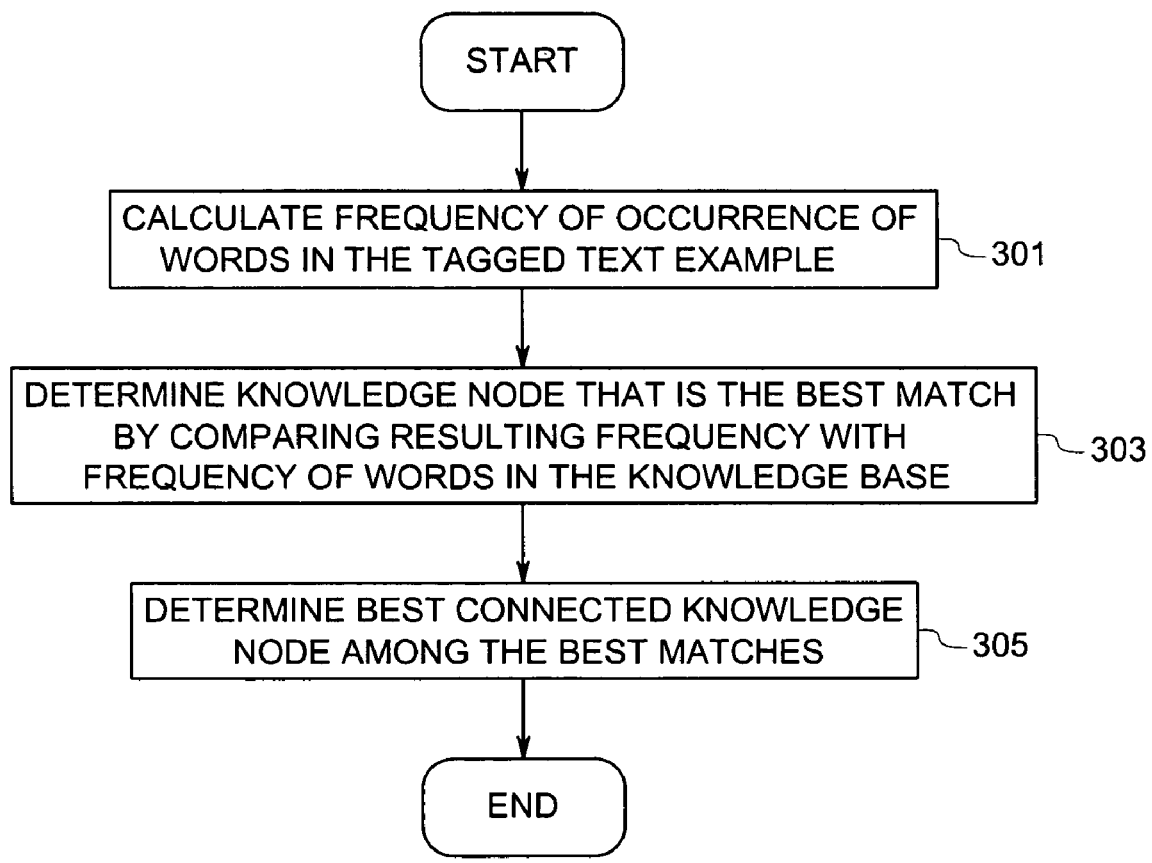
FIG. 3 is a flowchart that illustrates the step of mapping input tagged text examples to the knowledge nodes in further detail, in accordance with one embodiment of the present invention.

FIG. 3 is a flowchart that illustrates the process of mapping input tagged text examples to the knowledge nodes in the knowledge base in FIG. 2 in accordance with one embodiment of the invention.

At step 301, knowledge nodes that best match the input tagged example are determined. Matches are performed using standard natural language text clustering, where the frequency of occurrence of words in the input tagged example is calculated by reducing words to their roots in the example. Thus, a search for the word "swimming" will also match words "swam", "swum" and "swim", because the word swim is the root for all of these. That, if the word "swimming" is present in the tagged example, then the knowledge base will be searched for words "swam", "swum", "swimming" and "swim".

At step 303, the frequency of occurrence of words in the tagged example is compared to the normal frequency of the words in the knowledge base and a ratio is calculated. In other embodiment, the calculation need not be a ratio but any calculation that can determine similar properties can be used. Words that appear more frequently in the tagged example than the normal frequency of words in the knowledge base are considered the most relevant words. As a result, sentences, which share the most important words, are considered the best match.

At step 305, the number of matching knowledge nodes is reduced to knowledge nodes that are not only best matched, but also best connected to the tagged example. For instance, if two symptoms in the knowledge base seem to match the symptom in the tagged text example, the symptom of the stored case in the knowledge base whose other features match the current case the best, is considered "best connected".

Figure 4:
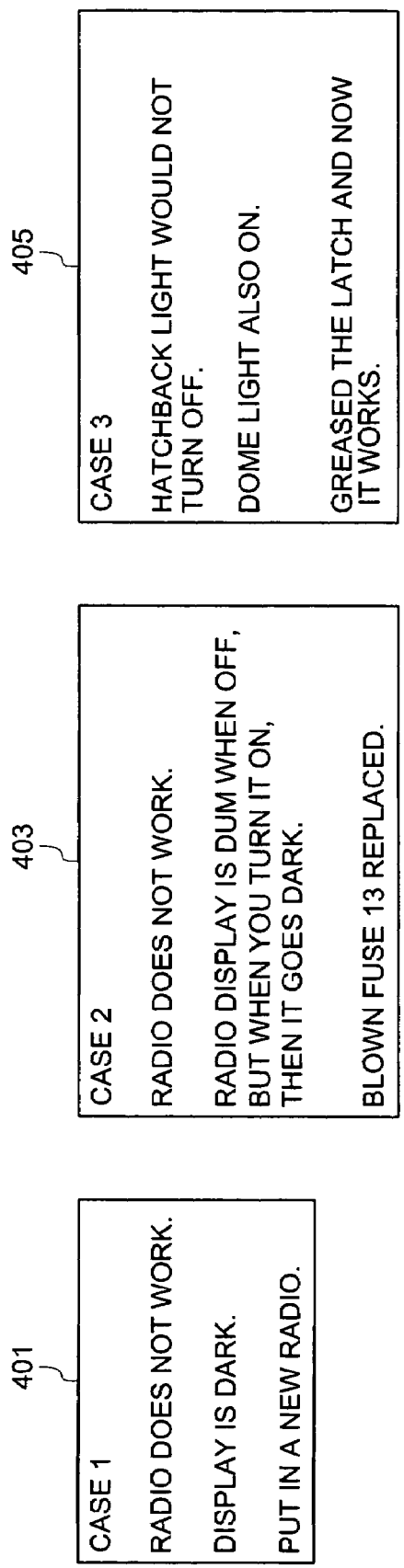
FIG. 4 is a schematic diagram that illustrates three exemplary case notes that form an exemplary knowledge base in accordance with one embodiment of the present invention.

FIG. 4 is a schematic diagram that illustrates three exemplary case notes 401, 403, 405 that form an exemplary knowledge base in accordance with one embodiment of the present invention. The information provided in these case notes is in an unstructured format. For instance, in the first case 401, the following information is provided:
"The radio does not work.
The display is dark.
Put in a new radio."
Similarly the second case 403 contains the following information:
"Radio is not working.
Radio display is dim when off, but when you turn it on, then it goes dark.
Blown fuse 13 replaced."
The third case 405 provides the following information:
"Hatchback light would not turn off.
Dome light also on.
Greased the latch and now it works."

Figure 5:
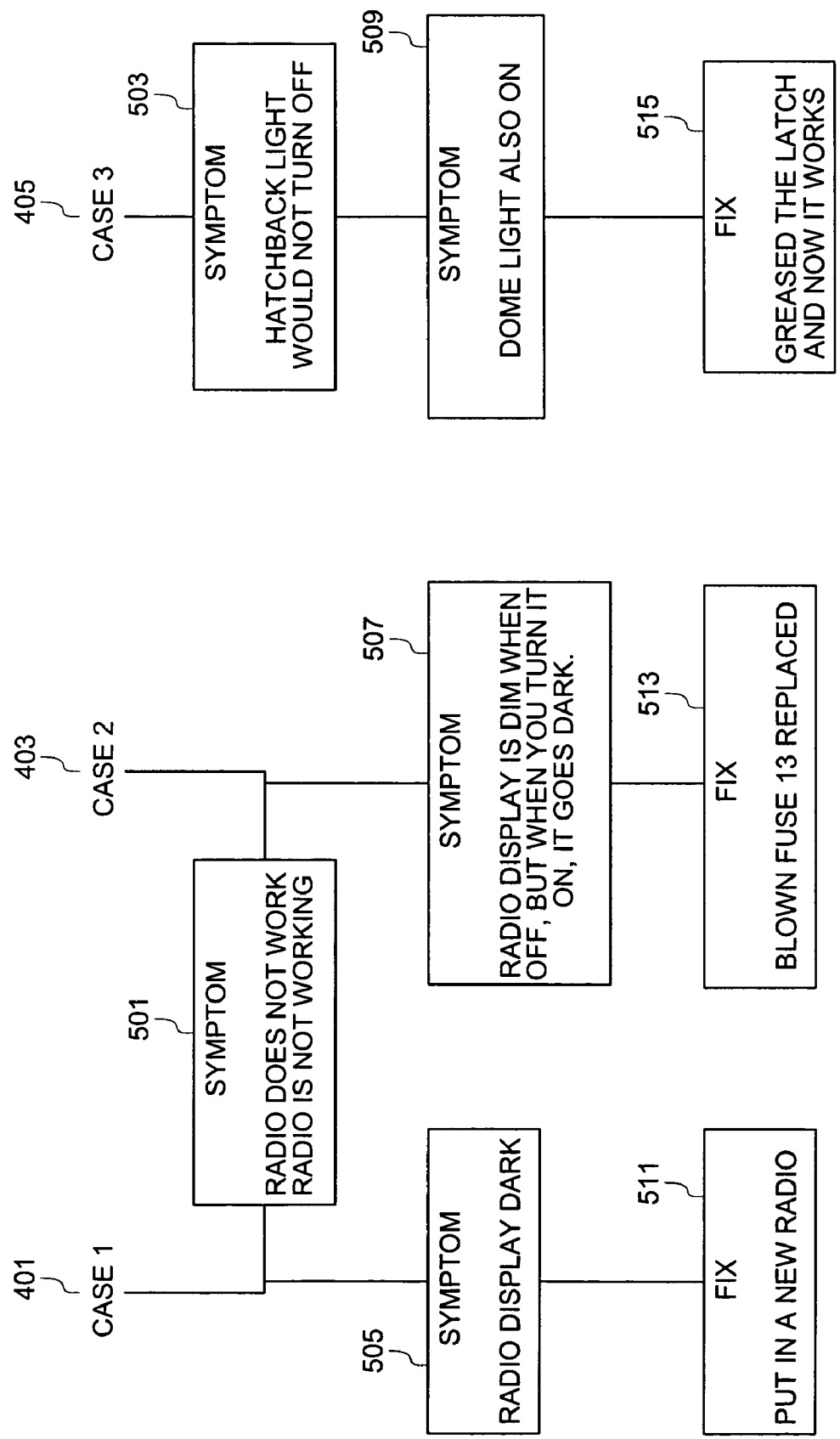
FIG. 5 is a schematic diagram that illustrates the structure of an exemplary knowledge base in accordance with one embodiment of the present invention.

These exemplary case notes are used as the basis while forming an exemplary knowledge base, as depicted in FIG. 5.

FIG. 5 is a schematic diagram that illustrates the structure of an exemplary knowledge base in accordance with one embodiment of the present invention. The knowledge base is organized in a hierarchical structure or a network of nodes (semantic structure), where the information in the three exemplary case notes 401, 403, 405 provided in FIG. 4 is arranged in hierarchical knowledge nodes, and tagged with structural markup tags such as <Symptom> 501, 503, 505, 507, 509 and <Fix> 511, 513, 515.

In Case 1 401, "Radio does not work" is tagged as <Symptom> 501 and "Radio display dark" is tagged as <Symptom> 505, while "Put in a new radio" is tagged as <Fix> 511.

In Case 2 403, "Radio is not working" is tagged as <Symptom> 501 and "Radio display is dim when off, but when you turn it on, then it goes dark" is tagged as <Symptom> 507, while "Blown fuse 13 replaced" is tagged as <Fix> 513.

Similarly, in Case 3 405, "Hatchback light would not turn off" is tagged as <Symptom> 503 and "Dome light also on" is tagged as <Symptom> 509, while "Greased the latch and now it works" is tagged as <Fix> 515.

The <Symptom> 501 "The radio does not work" of Case 1 401 is similar to the <Symptom> 501 "Radio is not working" of Case 2 403 and are therefore connected in the knowledge base.

Figure 6:
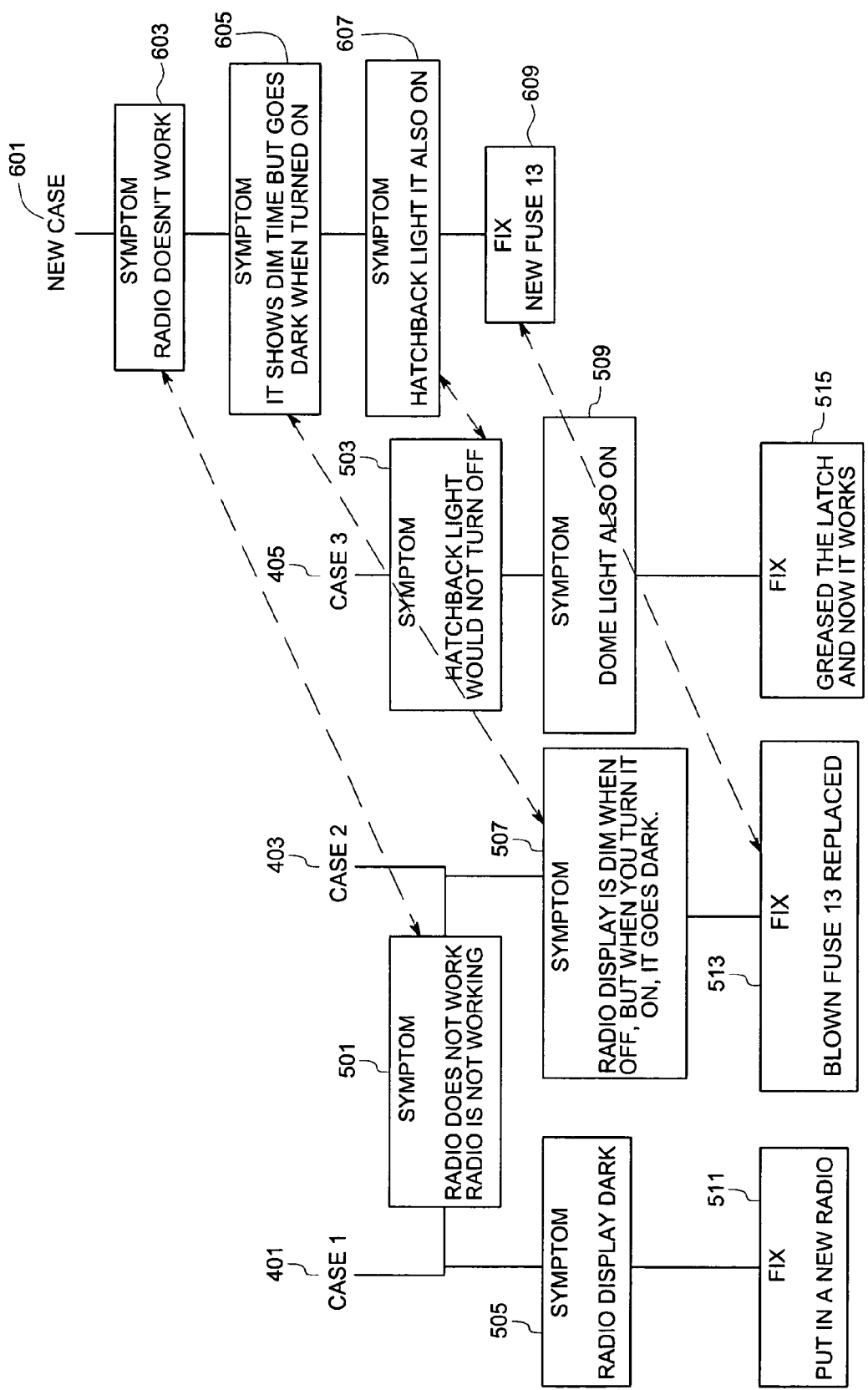
FIG. 6 is a schematic diagram that illustrates an exemplary situation wherein knowledge nodes are matched to an input tagged example, in accordance with one embodiment of the present invention.

FIG. 6 is a schematic diagram that illustrates an exemplary situation wherein knowledge nodes are matched to an input tagged example, in accordance with one embodiment of the present invention. The tags on the input case are not displayed to avoid confusion. The input case 601, which is shown as "New Case" in the figure, contains the following information:
  <Symptom> 603 "Radio doesn't work.
  <Symptom> 605 It shows dim time but goes dark when turned on.
  <Symptom> 607 Hatchback light is also on.
  <Fix> 609 New fuse 13."

The information in the input case 601 is compared to the existing information in the knowledge base. Case 2 403 in the knowledge base has information similar to the input case 601 — namely, the <Symptom> 501 "Radio is not working" in Case 2 403 is similar to the <Symptom> 603 "Radio doesn't work" in the input case 601.

The <Symptom> 507 "Radio display is dim when off, but when you turn it on, then it goes dark" in Case 2 403 is similar to the <Symptom> 605 "It shows dim time but goes dark when turned on" in the input case 601.

The <Fix> 609 "Blown fuse 13 replaced" in Case 2 403 is similar to the <Fix> 609 "New fuse 13" in the input case 601. As Case 2 403 shares the maximum information with the input case 601 it is best connected to the input case 601.

The input case 601 also shares a common <Symptom> 607 with Case 3 405. The <Symptom> 503 "Hatchback light would not turn off" in the Case 3 405 is similar to <Symptom> 607 "Hatchback light is also on" in the input case 601.

Steps 301 and 303 of FIG. 3 perform the above. Words like "Radio", "work", "does", "doesn't", "display", dim", "new", "fuse" etc. in the tagged examples are broken down to their root words, and matched with words in the knowledge base.

Figure 7:
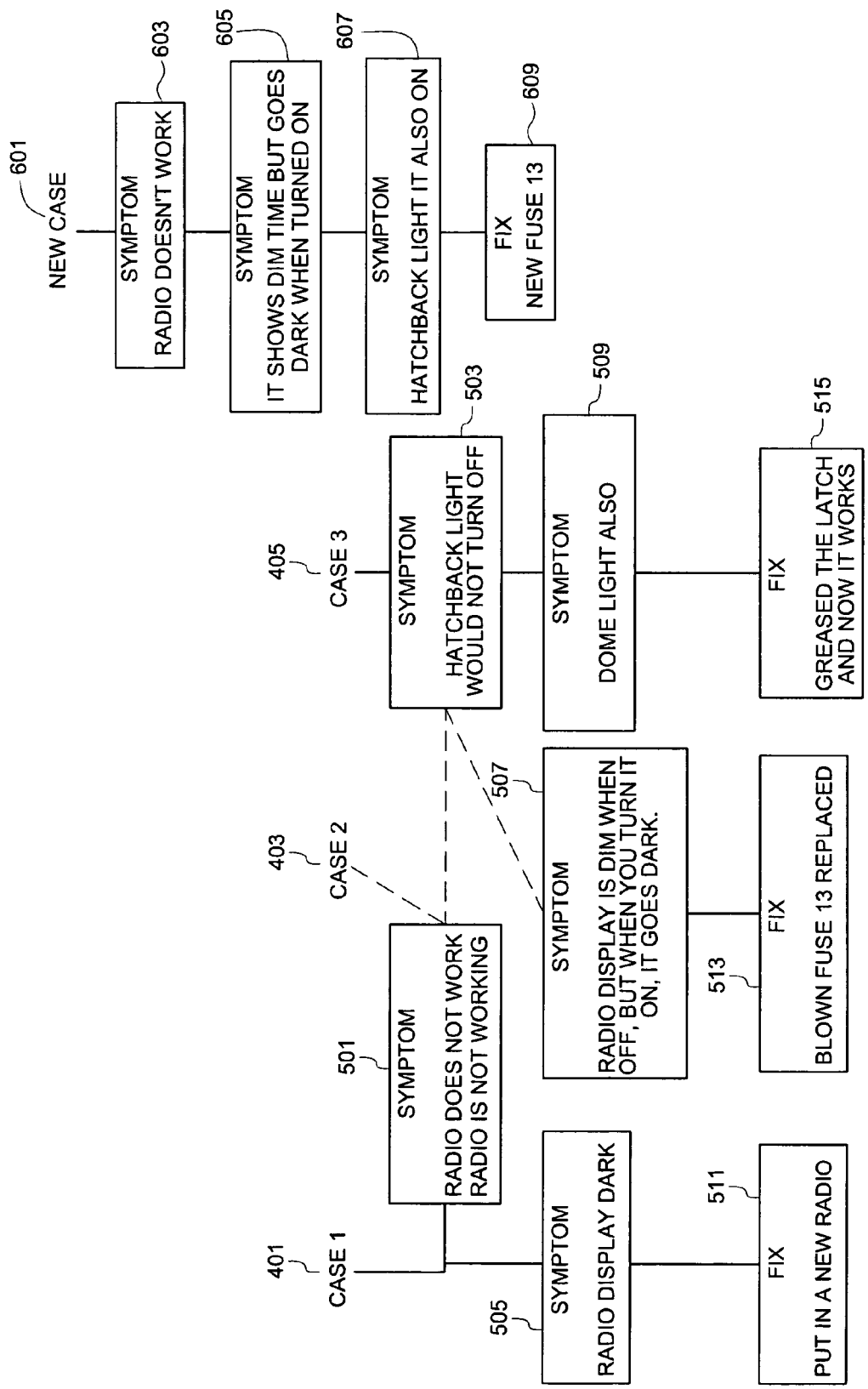
FIG. 7 is a schematic diagram that illustrates the process of determination of missing information in the knowledge base in accordance with one embodiment of the present invention.

FIG. 7 is a schematic diagram that illustrates the process of determination of missing information in the knowledge base in accordance with one embodiment of the present invention.

Once the input case 601 is matched with the cases in the knowledge nodes, as in FIG. 6, the information that is missing in knowledge base is identified. Case 2 403 and Case 3 405 match all the information in the input case 601, but neither of them completely matches the input case 601 by itself. Case 2 403 has all the information present in the input case 601, except for <Symptom< 607 "Hatchback light is also on", which is present in Case 3 405. Thus, the input case 601 is a new case that is to be added to the knowledge base.

The link between the information in the Case 2 403 and Case 3 405 is updated. The <Symptom> 501 "Radio is not working" of Case 2 403 is linked to <Symptom> 503 "Hatchback light would not turn off" of Case 3 405, which in turn is linked to <Symptom> 507 "Radio display is dim when off, but when you turn it on, then it goes dark" and in turn to <Fix> 513 "Blown fuse 13 replaced".

Figure 8:
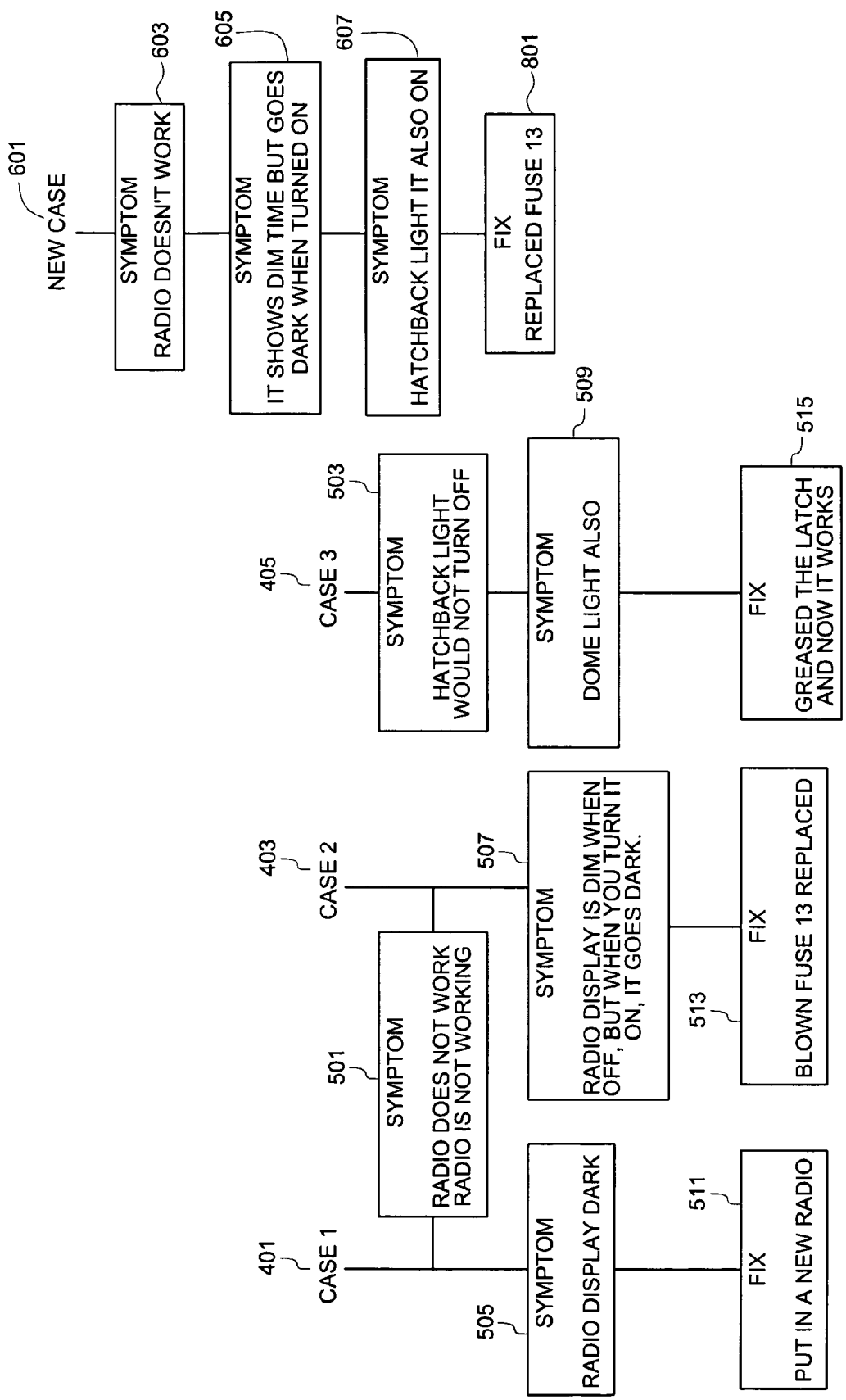
FIG. 8 is a schematic diagram that illustrates the addition of a new case to the knowledge base, based on the input case in accordance with one embodiment of the present invention.

FIG. 8 is a schematic diagram that illustrates the addition of a new case to the knowledge base, based on the input case in accordance with one embodiment of the present invention.

As a result of mapping the input case 601 information to the knowledge nodes in the knowledge base, in FIG. 7, Case 2 403 is determined to be the best connected to the input case 601. Case 2 403 mentions <Fix> 513 "Blown fuse 13 replaced".

Therefore, <Fix> 609 "New fuse 13" in the input case 601 depicted in FIG. 6 is substituted with <Fix> 801 "Replaced fuse 13" to include information from the second case 403. A new case 601 is thus revealed, and the user can accordingly update the knowledge base.

Figure 9:
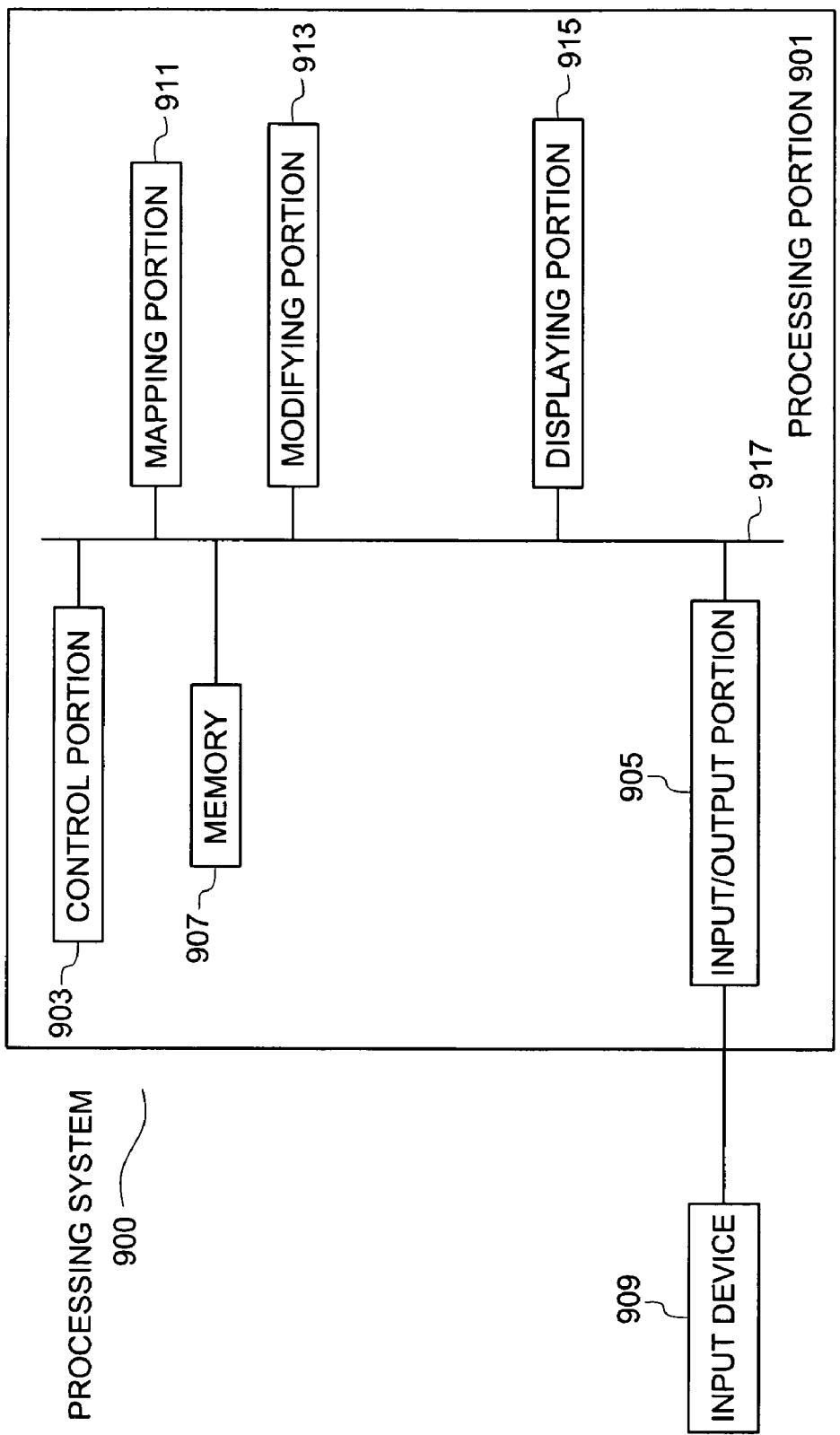
FIG. 9 is a block diagram that illustrates the system in accordance with one embodiment of the present invention.

In further explanation of the present invention, FIG. 9 is a block diagram that illustrates the system in accordance with one embodiment of the present invention. Processing portion 901 includes various components, namely a control portion 903, an input/output portion 905 and a memory 907. Control portion 903 controls overall operations of processing portion 901, such as coordinating the operation of the various components. Input/output portion 905 inputs a variety of data in conjunction with the input device 909. For example, the input device 909 might be a scanning device, a keyboard, a mouse or a device to provide connection to the Internet.

Processing portion 901 further includes a mapping portion 911, a modifying portion 913 and a displaying portion 915. The mapping portion 911 is responsible for matching knowledge nodes in the knowledge base with the tagged examples, as described in FIG. 2. The mapping is carried out by first determining a best match between the knowledge nodes and the tagged example. Determining the knowledge nodes that are best connected to the tagged examples further narrows the selected knowledge nodes.

The modifying portion 913 updates the indices of the knowledge nodes to improve its informational content, while the displaying portion 915 indicates the discrepancies between the existing knowledge base and the tagged examples to the user. The user can update the information, and remove the discrepancy, accordingly.

The various components of the processing portion 901 are connected using a suitable interface 917, such as a bus. Further, as mentioned above, the various components need not even be geographically together. In such case, interface 917 may even be a network such as the Internet.

While the various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. A computer implemented method for maintaining and updating a knowledge base, the knowledge base arranged in network structures and consisting of knowledge nodes, each of the knowledge nodes being further indexed using text matching methods, with examples that are tagged with a markup language, the method comprising:
    (a) receiving the tagged examples into memory of a computer from a user;
    (b) mapping the tagged examples to the knowledge nodes, including determining the knowledge nodes that are best matched to the tagged examples, and determining the knowledge nodes that are best connected to the tagged examples;
    (c) updating the knowledge base's indices;
    (d) determining the discrepancies between the knowledge nodes and the tagged examples; and
    (e) storing the discrepancies in the computer memory and displaying the discrepancies.

2. The method as recited in claim 1 wherein determining the knowledge nodes that are best matched to the tagged examples comprises the steps of:
    (a) determining the roots of words in the tagged examples;
    (b) calculating frequency of occurrence of the roots in the tagged examples; and
    (c) calculating the frequency of occurrence of roots to the frequency of words in the knowledge base.

3. The method as recited in claim 1 wherein determining the knowledge nodes that are best connected to the tagged examples comprises the steps of:
    (a) determining the network structure with the maximum number of matching knowledge nodes; and
    (b) displaying the best connected network structures in decreasing order of relevance.

4. The method as recited in claim 3 wherein the step of displaying the best-connected network structures in decreasing order of relevance, displaying the matched and mismatched portions of the network structures, if there are multiple matches.

5. A computer implemented method for maintaining and updating a knowledge base, the knowledge base arranged in network structures and consisting of knowledge nodes, each of the knowledge nodes being further indexed using text matching methods, with examples that are tagged with a markup language, the method comprising:
    (a) receiving the tagged examples into memory of a computer from a user;
    (b) mapping the tagged examples to the knowledge nodes;
    wherein the step of mapping the tagged examples further comprises the steps of:
        i) determining the knowledge nodes that are best matched to the tagged examples;
    wherein the step of determining the knowledge nodes that are best matched to the tagged examples comprises the steps of:
        1. determining the roots of words in the tagged examples;
        2. calculating frequency of occurrence of the roots in the tagged examples; and
        3. calculating the frequency of occurrence of roots to the frequency of words in the knowledge base; and
        ii) determining the knowledge nodes that are best connected to the tagged examples;
    wherein the step of determining the knowledge nodes that are best connected to the tagged examples comprises the steps of:
        1. determining the network structure with the maximum number of matching knowledge nodes; and
        2. displaying the best connected network structures in decreasing order of relevance;
    wherein the step of displaying the best-connected network structures in decreasing order of relevance, comprises the step of displaying the matched and mismatched portions of the network structures, if there are multiple matches;
    (c) updating the knowledge base's indices; and
    (d) determining the discrepancies between the knowledge nodes and the tagged examples, storing the discrepancies in the computer memory, and displaying the discrepancies.

6. A computer system for maintaining and updating a knowledge base, the knowledge base arranged in network structures and consisting of knowledge nodes, each of the knowledge nodes being indexed using text matching methods, with examples that are tagged with a markup language, comprising:
    (a) a input portion that receives the tagged examples into memory of a computer from a user;
    (b) a mapping portion for comparing the tagged examples with the knowledge nodes, including determining the knowledge nodes that are best matched to the tagged examples, and determining the knowledge nodes that are best connected to the tagged examples;
    (c) a portion for determining discrepancies between the knowledge nodes and the tagged examples;
    (d) a modifying portion for updating the knowledge base's indices; and
    (e) a portion for storing the discrepancies in the computer memory and displaying the discrepancies.

7. A computer program product for use with a computer, the computer program product comprising a computer usable medium having a computer readable program code embodied therein for maintaining and updating a knowledge base, the knowledge base stored on a computer readable medium and arranged in network structures and consisting of knowledge nodes, each of the knowledge nodes being further indexed using text matching methods, with examples that are tagged with a markup language, the computer program code performing the steps of:
- (a) receiving the tagged examples into memory of a computer from a user;
- (b) mapping the tagged examples to the knowledge nodes, including determining the knowledge nodes that are best matched to the tagged examples, and determining the knowledge nodes that are best connected to the tagged examples;
- (c) updating the knowledge base's indices;
- (d) determining the discrepancies between the knowledge nodes and the tagged examples; and
- (e) storing the discrepancies in the computer memory and displaying the discrepancies.

8. The computer program product as recited in claim 7, wherein determining the knowledge nodes that are best matched to the tagged examples comprises the steps of:
- (a) determining the roots of words in the tagged examples;
- (b) calculating frequency of occurrence of the roots in the tagged examples; and
- (c) calculating the frequency of occurrence of roots to the frequency of words in the knowledge base.

9. The computer program product as recited in claim 7, wherein determining the knowledge nodes that are best connected to the tagged examples comprises the steps of:
- (a) determining the network structure with the maximum number of matching knowledge nodes; and
- (b) displaying the best connected network structures in decreasing order of relevance.

10. The computer program product as recited in claim 9, wherein the step of displaying the best-connected network structures in decreasing order of relevance, comprises the step of displaying the matched and mismatched portions of the network structures, if there are multiple matches.

11. A computer program product for use with a computer, the computer program product comprising a computer usable medium having a computer readable program code embodied therein maintaining and updating a knowledge base, the knowledge base stored on a computer readable medium and arranged in network structures and consisting of knowledge nodes, each of the knowledge nodes being further indexed using text matching methods, with examples that are tagged with a markup language, the computer program code performing the steps of:
- (a) receiving the tagged examples into memory of a computer from a user;
- (b) mapping the tagged examples to the knowledge nodes;
- wherein the step of mapping the tagged examples further comprises the steps of:
  - i) determining the knowledge nodes that are best matched to the tagged examples;
  - wherein the step of determining the knowledge nodes that are best matched to the tagged examples comprises the steps of:
    1. determining the roots of words in the tagged examples;
    2. calculating frequency of occurrence of the roots in the tagged examples; and
    3. calculating of the frequency of occurrence of roots to the frequency of words in the knowledge base; and
  - ii) determining the knowledge nodes that are best connected to the tagged examples;
  - wherein the step of determining the knowledge nodes that are best connected to the tagged examples comprises the steps of:
    1. determining the network structure with the maximum number of matching knowledge nodes; and
    2. displaying the best connected network structures in decreasing order of relevance;
  - wherein the step of displaying the best-connected network structures in decreasing order of relevance, comprises the step of displaying the matched and mismatched portions of the network structures, if there are multiple matches;
- (c) updating the knowledge base's indices; and
- (d) determining the discrepancies between the knowledge nodes and the tagged examples, storing the discrepancies in the computer memory, and displaying the discrepancies.

* * * * *

UNITED STATES PATENT AND TRADEMARK OFFICE
CERTIFICATE OF CORRECTION

| | | |
|---|---|---|
| PATENT NO. | : 7,401,063 B2 | Page 1 of 1 |
| APPLICATION NO. | : 10/318682 | |
| DATED | : July 15, 2008 | |
| INVENTOR(S) | : Cuddihy et al. | |

It is certified that error appears in the above-identified patent and that said Letters Patent is hereby corrected as shown below:

In Fig. 6, Sheet 6 of 9, for Tag "607", Line 2, delete "IT" and insert – IS --, therefor.

In Fig. 7, Sheet 7 of 9, for Tag "607", Line 2, delete "IT" and insert -- IS --, therefor.

In Fig. 8, Sheet 8 of 9, for Tag "607", Line 2, delete "IT" and insert -- IS --, therefor.

In Column 6, Line 41, delete "<Symptom<" and insert -- <Symptom> --, therefor.

In Column 8, Line 5, in Claim 4, after "relevance," insert -- comprises the step of --.

Signed and Sealed this

Thirty-first Day of March, 2009

JOHN DOLL
*Acting Director of the United States Patent and Trademark Office*